United States Patent
Price, Sr.

[11] 3,923,336
[45] Dec. 2, 1975

[54] TOTE-A-ROOM

[76] Inventor: Blake R. Price, Sr., P.O. Box 101, Damascus, Va. 24236

[22] Filed: Nov. 13, 1974

[21] Appl. No.: 523,232

[52] U.S. Cl. .................. 296/26; 135/1 A; 135/3 A; 296/23 R
[51] Int. Cl.² .......................................... B62D 33/08
[58] Field of Search .............. 296/23 MC, 23 R, 26; 135/1 A, 3 A, 5 A

[56] References Cited
UNITED STATES PATENTS

| | | | |
|---|---|---|---|
| 13,600 | 9/1855 | Nelson | 135/5 A |
| 3,463,540 | 8/1969 | Carr | 296/23 R |
| 3,511,529 | 5/1970 | Cutsinger | 296/23 R |
| 3,599,651 | 8/1971 | Perry | 135/1 A |
| 3,707,977 | 1/1973 | Grady | 135/1 A |

*Primary Examiner*—Robert J. Spar
*Assistant Examiner*—Donald W. Underwood
*Attorney, Agent, or Firm*—Marden S. Gordon

[57] ABSTRACT

A tote-a-room tent accessory for truck mounted camper units intended to be mounted to the rear of the camper as a permanent part thereof and to open relative to the camper to form an extension rearwardly of the back end of the camper to increase the living area and living capacity of the camper unit.

6 Claims, 8 Drawing Figures

U.S. Patent  Dec. 2, 1975  3,923,336
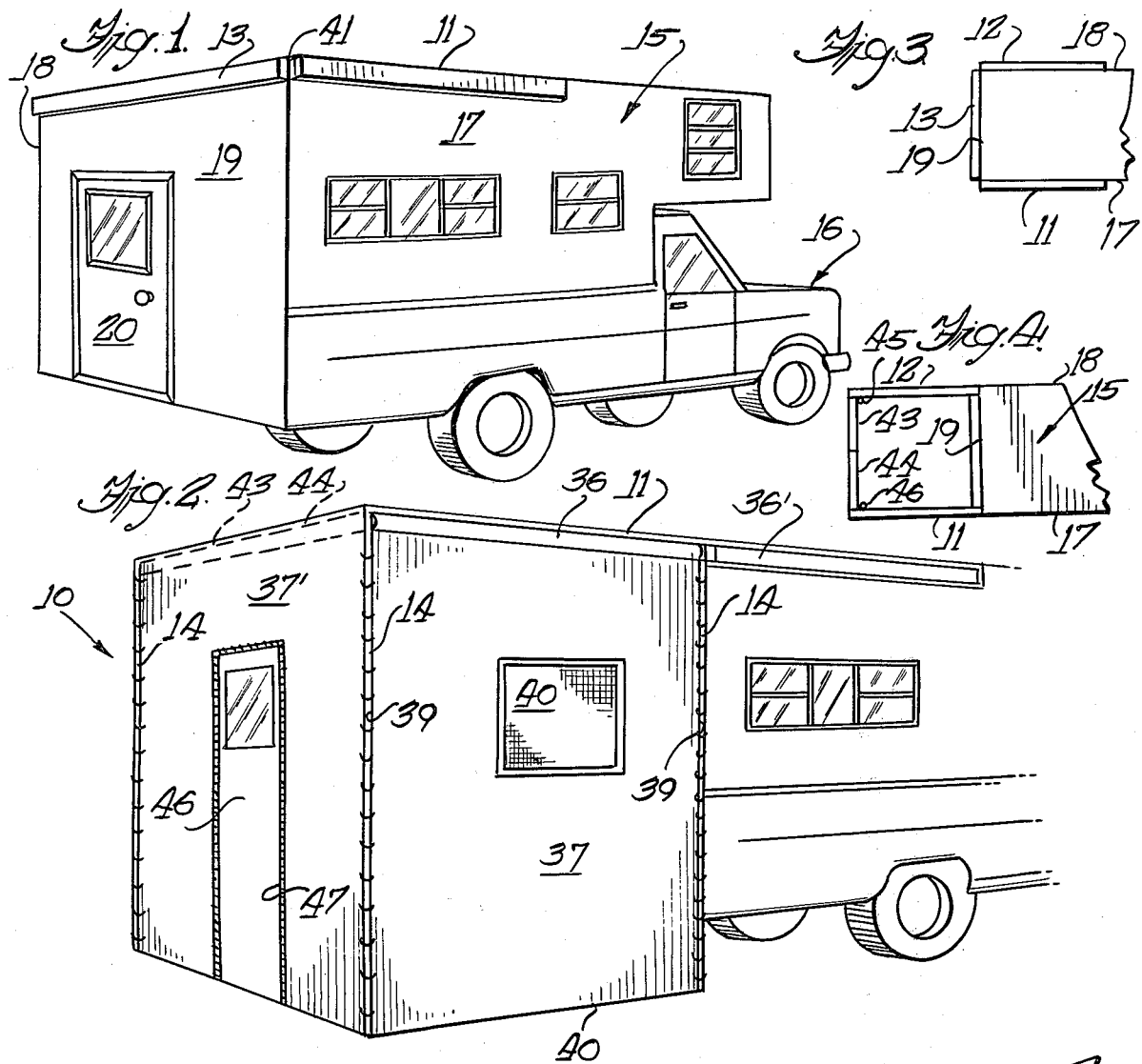
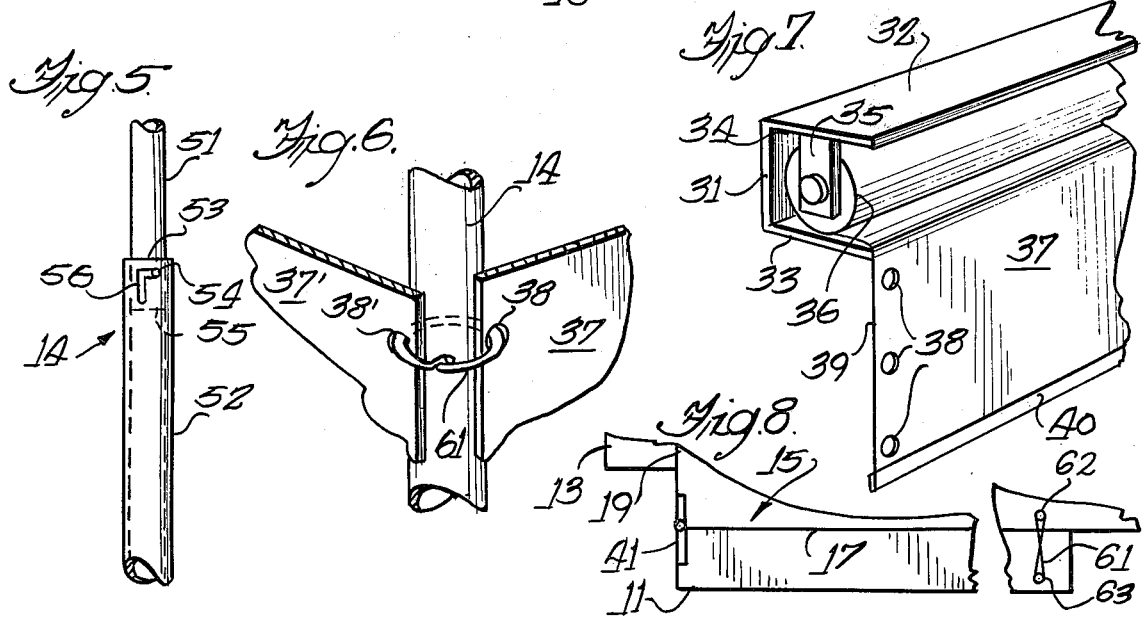

TOTE-A-ROOM

BACKGROUND OF THE INVENTION

1. Field of the Invention

This invention relates generally to truck mounted camper units and more particularly to a novel and improved tote-a-room intended for permanently mounting on the unit and movable between a storage position providing no interference to the transportation of the unit, and an extended operative position providing additional enclosure rearwardly of the unit to provide increased capacity and sleeping and living area for the camping unit.

2. Description of the Prior Art

Camping units of various types are well known, such as trailers, truck mounted campers, and separate self-supporting tent structures. Among the most popular of these units is the truck mounted camper of the type mounted in the bed of a pick-up truck, the main disadvantage of this type of unit being the limited living and sleeping area thereof so that it is not suitable for the accommodation of a growing or large family.

SUMMARY OF THE INVENTION

The present invention provides a novel tote-a-room structure intended to be permanently mounted to the top of the sides and rear of the camper unit in a manner not encumbering the mobility of the camper unit while being adapted to be unfolded to provide an additional enclosed area rearwardly of the camping unit to increase the living area and sleeping area thereof.

It is a feature of the present invention to provide a tote-a-room.

A further feature of the present invention provides a tote-a-room which is relatively simple in its construction and which therefore may be readily manufactured at a relatively low cost and by simple manufacturing methods so that it can be retailed at a price appealing to prospective purchasers.

Still a further feature of the present invention provides a tote-a-room which is easy to use and reliable and efficient in operation.

Still yet a further feature of the present invention provides a tote-a-room which may, in its entirety, be manufactured and installed as part of the original equipment of the truck mounted camper unit, or which may be attached to the camper unit later as an accessory item.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of a truck mounted camper having the tote-a-room of the present invention mounted thereon;

FIG. 2 is a perspective view of the rear end portion of the truck mounted camper with the tote-a-room in the open operative position;

FIG. 3 is a fragmentary top plan view of the camper with the tote-a-room in the storage position;

FIG. 4 is a top plan view similar to FIG. 3 but with the tote-a-room rollers and cross-bar supports illustrated in the operative position;

FIG. 5 is a fragmentary front elevational view of a telescopic pole;

FIG. 6 is a fragmentary perspective view of the attachment of the walls of the tote-a-room to the telescopic pole;

FIG. 7 is a fragmentary perspective view of one of the walls in the partially open position; and FIG. 8 is a fragmentary top plan view of one of the walls in the storage position secured to the adjacent side wall of the camper unit.

DESCRIPTION OF THE PREFERRED EMBODIMENT

Referring now to the drawings in detail there is illustrated a preferred form of a tote-a-room constructed in accordance with the principles of the present invention and which is designated generally in its entirety by the reference numeral 10 and which is comprised of two rollers 11 and 12 affixed to the top side edges of a camper unit 15, and a back roller 13 affixed along the top edge of the back wall surface of the camper unit 15, and a series of telescoping poles 14.

The camper unit 15 is of a conventional design for purposes of illustration and is shown as mounted in the bed of a pick-up type truck 16, the camper unit including opposite side walls 17 and 18 and vertical back wall 19 having a door 20 therein.

The rollers 11 and 12 are of an identical configuration with roller 11 disposed along the top edge of side wall 17 and with roller 12 disposed along the top edge of side wall 18. Each of the rollers is of an elongated channel forming body member having a U-shaped cross-section formed of a flat vertical back surface 31 and opposed parallel outwardly depending top and bottom side wall surfaces 32 and 33 defining the channel 34 therebetween. A pair of opposed brackets 35 are each affixed to the interior of side wall 32 at opposite ends thereof and project downwardly into channel 34 and rotatively support therebetween a roller 36 having wrapped thereabout in a coiled manner a length of flexible canvas sheeting 37 provided with a series of vertically spaced apart and aligned paertures 38 along opposite edges 39 thereof. An elongated wooden or other rigid elongated flat member 40 extends along the botoom edge of sheeting 37 and serves to rigidify the same. A screened window 40 is provided centrally of each of the sheetings 37, such as seen in FIG. 2.

The roller 11 is hinged to side wall 17 by a hinge 41 for swinging movement thereabout between an inoperative storage position overlying area 36' of FIG. 2 and secured to the camper 15 by means of a resilient wire member 61 passed about pins 62 and 63 which are secured to the camper top and to the top side edge 32 respectively. Roller 11 swings about the hinge 41 to a position extending straight rearwardly of the side edge, this being the operative position thereof.

Hingedly connected to the outermost ends of the rollers 11 and 12 are crossbars 43 and 44 which are hinged by hinges 45 and 46 to the roller members 12 and 11 respectively for swingable movement relative thereto between the storage position and an open position, the open position being as illustrated in FIG. 4 with the crossbars lying in alignment with each other.

Roller member 13 is identical in construction to the roller members 11 and 12 only the back wall 31 thereof is permanently affixed along the top edge of the camper unit back wall 19 rather than being hinged thereto in the case of the roller units 11 and 12. In addition, there is provided in sheeting 37' of the roller unit 13 a door member 46 which is zippered therein by means of zipper 47 for selective ingress and egress of the tote-a-room 10.

To provide vertical supports for the sheeting 37 and 37' as well as to support the operative positions of the roller units 11 and 12, there are provided a plurality of separate telescopic pole members 14 each including an upper and lower section 51 and 52 of a tubular structure, the upper mast section 51 being telescopically received in the top end 53 of lower mast section 52 and being secured in position therein by means of a pin 54 projecting outwardly of a side wall surface of the mast 51 adjacent bottom end 55 thereof and which is received in the inverted L-shaped slot 56 of mast section 52 for locking the mast sections in extended position relative to each other while permitting telescopic collapsing of mast section 51 into mast section 52 during storage of the tote-a-room.

In operation, roller units 11 and 12 are swung about their hinges 41 to a position extending rearwardly of the camper end wall 19, after which cross bars 43 and 44 are swung to their open position. Sheetings 37 are then drawn downwardly from their rollers 36 until the bars 40 rest on the ground surface, these forming the side wall portions of the tote-a-room. Sheeting 37' is then unrolled from the roller of roller unit 13 in a manner to form the top horizontal surface of the tote-a-room, after which the sheeting is drawn vertically downwardly over the cross arms 43 and 44 until it touches the ground, this thus also forming the back wall of the tote-a-room. Mast 14 are then extended and affixed in vertical position adjacentmost each end of the roller units 11 and 12 and extend downwardly to the ground, after which a series of rings 61 are inserted through the apertures 38 and 38' in sheeting 37 and 37' to secure the edges of the sheeting to the mast and complete the tote-a-room enclosure.

To prepare the camper unit for travel, the above procedure is reversed such that the camper unit is rapidly prepared for travel and the tote-a-room remains as a permanent structure affixed to the camper unit without in any way encumbering the mobility of the camper unit. There is thus permanently mounted on the camper unit the tote-a-room of the present invention in a manner not occupying any of the normally crowded interior space of the camper and operable such that when unfolded it adds an additional eating and sleeping area to the camper unit.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A tote-a-room enclosure intended for permanent mounting as an accessory item to a truck mounted camper unit, the camper unit having opposed side walls and a vertical back wall, the tote-a-room comprising, in combination:

a pair of identically constructed side roller assemblies means adapted to mount said side roller assemblies hingedly to opposite top edges of opposite side walls of said camper unit such that each of the side roller assemblies is swingable in a horizontal plane between a storage position disposed in parallel juxtaposition to the associated side walls of the camper, and an operative position projecting rearwardly of said camper rear wall;

a length of flexible sheeting disposed in a coil in each of said side roller assemblies and adapted to be uncoiled therefrom to define side wall portions of said tote-a-room;

a back roller assembly adapted to be mounted across the top edge of said trailer back wall;

a length of flexible sheeting material coiled in said back roller assembly and adapted to be uncoiled therefrom in a manner to define a top and a back wall to said tote-a-room;

a cross-arm assembly pivotally affixed to a portion of each of said side roller assemblies and adapted to be placed in longitudinal alignment with each other interconnecting said side roller assemblies when said side roller assemblies are in said operative position, said operative position of said cross arms being substantially parallel to said trailer back wall;

said cross-arms supporting thereover said back roller sheeting to divide said back roller sheeting into a horizontal roof forming top portion and a vertical back wall forming portion;

rods disposed at each end of said side roller assemblies and extending vertically downwardly therefrom to engage the ground; and means slidable along said rod members to affix adjacentmost edges of said sheeting material to said rods.

2. The tote-a-room as set forth in claim 1 further characterized by a screened rectangularly shaped aperture defined in each of said sheeting material of each of said side roller assemblies; and an elongated rectangular door shaped panel opening defined in said back roller sheeting material and being closed by a flexible sheeting door forming member disposed in said opening and secured therein by means of a continuous zipper to provide selective ingress and egress of said tote-a-room when in the operative position.

3. The tote-a-room as set forth in claim 2 wherein each of said side roller and said back roller assemblies comprises:

an elongated body member having a flat vertical back wall member and opposed spaced apart horizontal outwardly depending top and bottom side wall members;

a channel of U-shaped cross-section defined in said body member and extending completely between said back, top and bottom wall members between opposite ends thereof and opening out of an open front wall of said body member;

a pair of longitudinally spaced apart brackets each affixed to opposite ends of said body member and projecting into said channel;

a roller disposed in said channel along the longitudinal axis thereof and having its opposite ends rotatively supported in said brackets;

an elongated flat sheet of flexible sheeting wrapped about said roller;

a multitude of longitudinally spaced apart apertures positioned in opposite side edge portions of said sheeting and extending completely therealong; and a rigid bar affixed along a bottom edge of said sheeting to rigidify the same.

4. The tote-a-room as set forth in claim 3 wherein said means adapted to mount said side roller assemblies hingedly to opposite top edges of opposite side walls of said camper unit comprises:

a pair of hinge members, each hinge member associated with one end of one of said side roller assemblies and adapted to be mounted to a top edge surface of said camper unit adjacent said back wall.

5. The tote-a-room as set forth in claim 4 further characterized by each of said vertical rods disposed at each end of said side roller assemblies, comprising:

a first cylindrical mast member;

a second hollow open ended cylindrical mast member having a cylindrical bore extending therein and telescopically receiving said first mast member through one end thereof;

a pin projecting diametrically upwardly from a side wall of said first mast section adjacent a bottom end portion thereof; and an inverted L-shaped slot formed in said second mast section side wall adjacent to top edge thereof and adapted to receive said pin therein and operable in a manner to retain said mast sections together in a telescopic fashion and also to permit said first mast section to be telescopically inserted into said second mast section for storage therein.

6. The tote-a-room as set forth in claim 5 wherein said means slidable along said rod members comprises a multitude of separate rings each of a diameter to be inserted over an associated rod member, each ring adapted to be inserted through said sheeting apertures for slidingly retaining an associated edge of said sheeting along said rod.

\* \* \* \* \*